United States Patent

Chan

[11] Patent Number: 5,713,018
[45] Date of Patent: Jan. 27, 1998

[54] SYSTEM AND METHOD FOR PROVIDING SAFE SQL-LEVEL ACCESS TO A DATABASE

[75] Inventor: Patrick P. Chan, Palo Alto, Calif.

[73] Assignee: Sun Microsystems, Inc., Mountain View, Calif.

[21] Appl. No.: 534,576

[22] Filed: Sep. 27, 1995

[51] Int. Cl.⁶ .................................................. G06F 17/30
[52] U.S. Cl. ........................ 395/610; 395/600; 395/606
[58] Field of Search ................................ 395/609, 610, 395/606

[56] References Cited

U.S. PATENT DOCUMENTS

| | | | |
|---|---|---|---|
| 5,388,196 | 2/1995 | Pajak et al. | 395/153 |
| 5,410,598 | 4/1995 | Shear | 380/4 |
| 5,410,693 | 4/1995 | Yu et al. | 395/600 |
| 5,495,533 | 2/1996 | Linehan et al. | 380/21 |
| 5,546,583 | 8/1996 | Shriver | 395/650 |
| 5,596,718 | 1/1997 | Boebert et al. | 395/187.01 |
| 5,596,745 | 1/1997 | Lai et al. | 395/614 |
| 5,600,831 | 2/1997 | Levy et al. | 395/602 |

Primary Examiner—Thomas G. Black
Assistant Examiner—Jean M. Corrielus
Attorney, Agent, or Firm—Gary S. Williams; Flehr Hohbach Test Albritton & Herbert LLP

[57] ABSTRACT

A distributed computer system has an information server and a plurality of client computers coupled by one or more communication paths to the information server. The information server includes a database management system (DBMS) with an interface procedure for receiving and responding to SQL statements from client computers. At least one client computer has a database access procedure for sending SQL statements to the DBMS in the information server. The database access procedure includes embedded encrypted SQL statements, representing a predefined subset of a predefined full set of SQL statements recognized as legal SQL statements by the DBMS. For instance, the predefined subset of SQL statement might include only SQL statements for reading data in the DBMS, but not include SQL statements for modifying and adding data to the DBMS. Each of the SQL statements sent by the database access procedure to the DBMS includes a corresponding one of the encrypted SQL statements. The DBMS in the information server includes an interface procedure for processing all SQL statements received from client computers, including a decoding procedure for decoding the encrypted SQL statement included in the SQL statements sent by the database access procedure in the one client computer. The received SQL statement is executed by the DBMS only if the decoded SQL statement is a legal SQL statement. In addition, the interface procedure rejects received SQL statements that do not include an encrypted SQL statement.

6 Claims, 4 Drawing Sheets

Modified DBMS Access Procedure
202, 206

SYSTEM AND METHOD FOR PROVIDING SAFE SQL-LEVEL ACCESS TO A DATABASE

The present invention relates generally to systems and methods for enabling remote client computers to access data in a database server using standard SQL-level statements, and particularly-to a system and method for enabling remote, untrusted client computers to access data in a database server using only a predefined subset of the possible SQL statements and for blocking the usage of all other SQL statements by the remote, untrusted client computers.

BACKGROUND OF THE INVENTION

The present invention is designed to solve the following problem. Suppose you have a database and a database management system (DBMS) for controlling use of that database. Furthermore, you want to allow remote, untrusted clients to access the database. The problem is that while you want the remote untrusted clients to be able to use some SQL statements, there are other SQL statements that you don't want them to be able to use. For instance, you might want to allow the untrusted clients to read data from the database, but you might also want to make sure that the untrusted clients did not have the ability to modify the database.

In addition, it is a goal of the present invention to allow the DBMS to accept and respond to all legal SQL commands, without having to distinguish between remote, untrusted clients and other, more trusted clients. Obviously certain classes of SQL commands will still require special operator privileges, such as the commands for partitioning database tables and the like. But for unprivileged SQL commands, it is the goal of the present invention to provide a mechanism that allows strict limiting of the class of SQL commands that can be issued by remote untrusted clients to the information server on which the database reside, while allowing other clients to use a wide range of SQL commands.

SUMMARY OF THE INVENTION

In summary, the present invention is a distributed computer system having an information server and a plurality of client computers coupled by one or more communication paths to the information server. The information server includes a database management system (DBMS) with an interface procedure for receiving and responding to SQL statements from client computers.

At least one client computer has a database access procedure for sending SQL statements to the DBMS in the information server. The database access procedure includes embedded encrypted SQL statements, representing a predefined subset of a predefined full set of SQL statements recognized as legal SQL statements by the DBMS. For instance, the predefined subset of SQL statement might include only SQL statements for reading data in the DBMS, but not include SQL statements for modifying and adding data to the DBMS. Each of the SQL statements sent by the database access procedure to the DBMS includes a corresponding one of the encrypted SQL statements.

The DBMS in the information server includes an interface procedure for processing all SQL statements received from client computers, including a decoding procedure for decoding the encrypted SQL statement included in the SQL statements sent by the database access procedure in the one client computer. The received SQL statement is executed by the DBMS only if the decoded SQL statement is a legal SQL statement. In addition, the interface procedure rejects received SQL statements that do not include an encrypted SQL statement.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
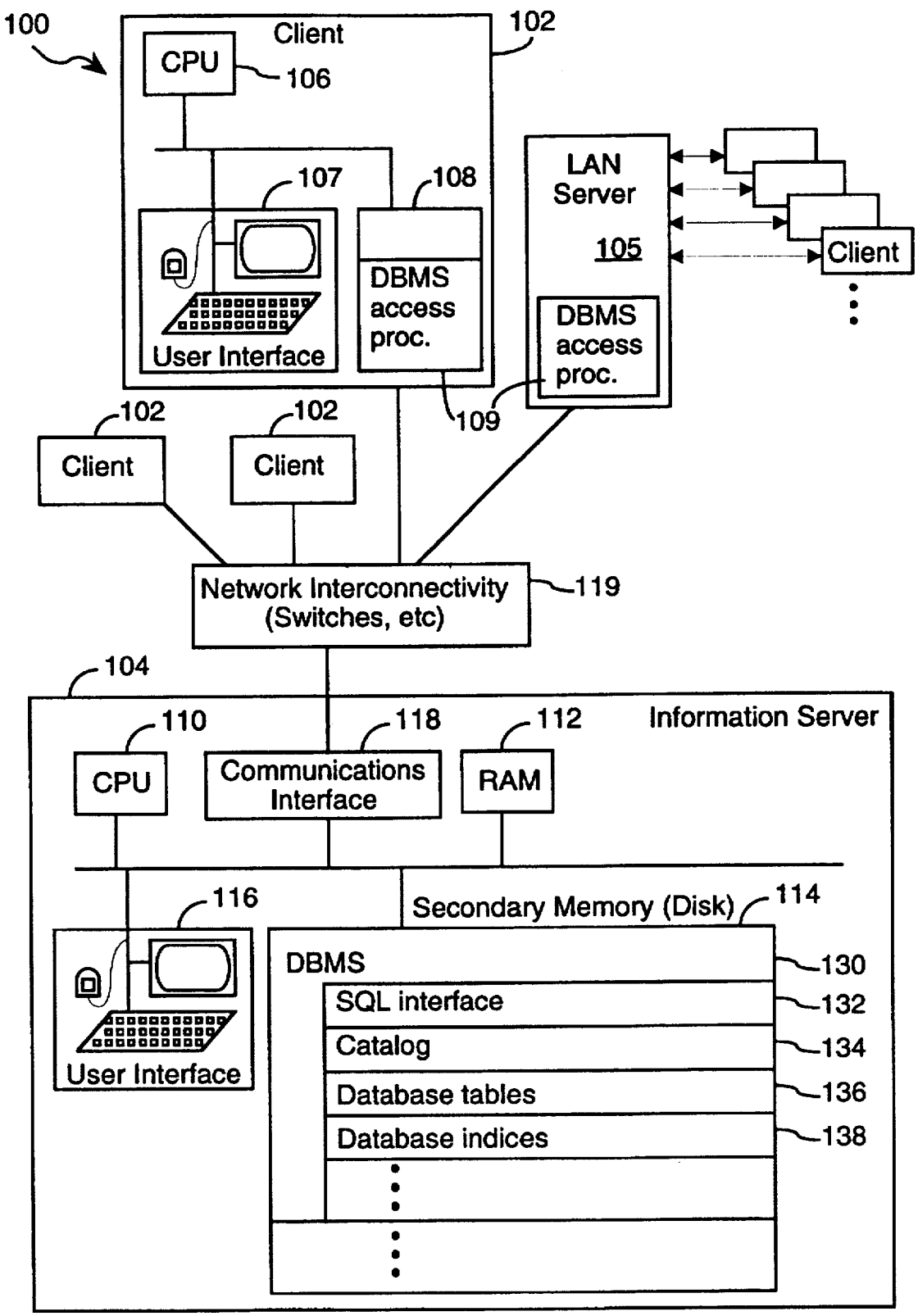
FIG. 1 is a block diagram of a distributed computer system including client computers and an information server.

Referring to FIG. 1, there is shown a distributed computer system 100 having many client computers 102 and at least one information server computer 104. In some instances a set of client computers 102 will be connected to the information server 104 indirectly through a local area network server or other gateway 105. "Client computers" are often called "subscribers' computers" and those terms will be used synonymously.

While most client computers are desktop computers, such as Sun workstations, IBM compatible computers and Macintosh computers, virtually any type of computer can be a client computer. In the preferred embodiment, each client computer 102 is connected to the information server 104 via a local or wide area network 119, although other types of communication connections (including a connection through the Internet) could be used. For the purposes of this document, it will be assumed that each client computer includes a CPU 106, user interface 107, and memory 108 for storing the DBMS access software 109 needed to retrieve database information from the information server 104. In some instances, the DBMS access software 109 may be stored in a file server shared by numerous client computers.

The information server 104 includes a central processing unit 110, primary memory 112 (i.e., fast random access memory) and secondary memory 114 (typically disk storage), a user interface 116, a communications interface 118 for communication with the client computers 102 via the communications network 119. For the purposes of the present discussion, it will be assumed that the information server 104 contains a conventional database management system (DBMS) 130, including a set of SQL interface procedures 132 for responding to SQL statements from client computers, a catalog 134 for denoting the structure of all the database tables in the DBMS, a set of database tables 136 and a set of corresponding database index files 138.

Figure 2:
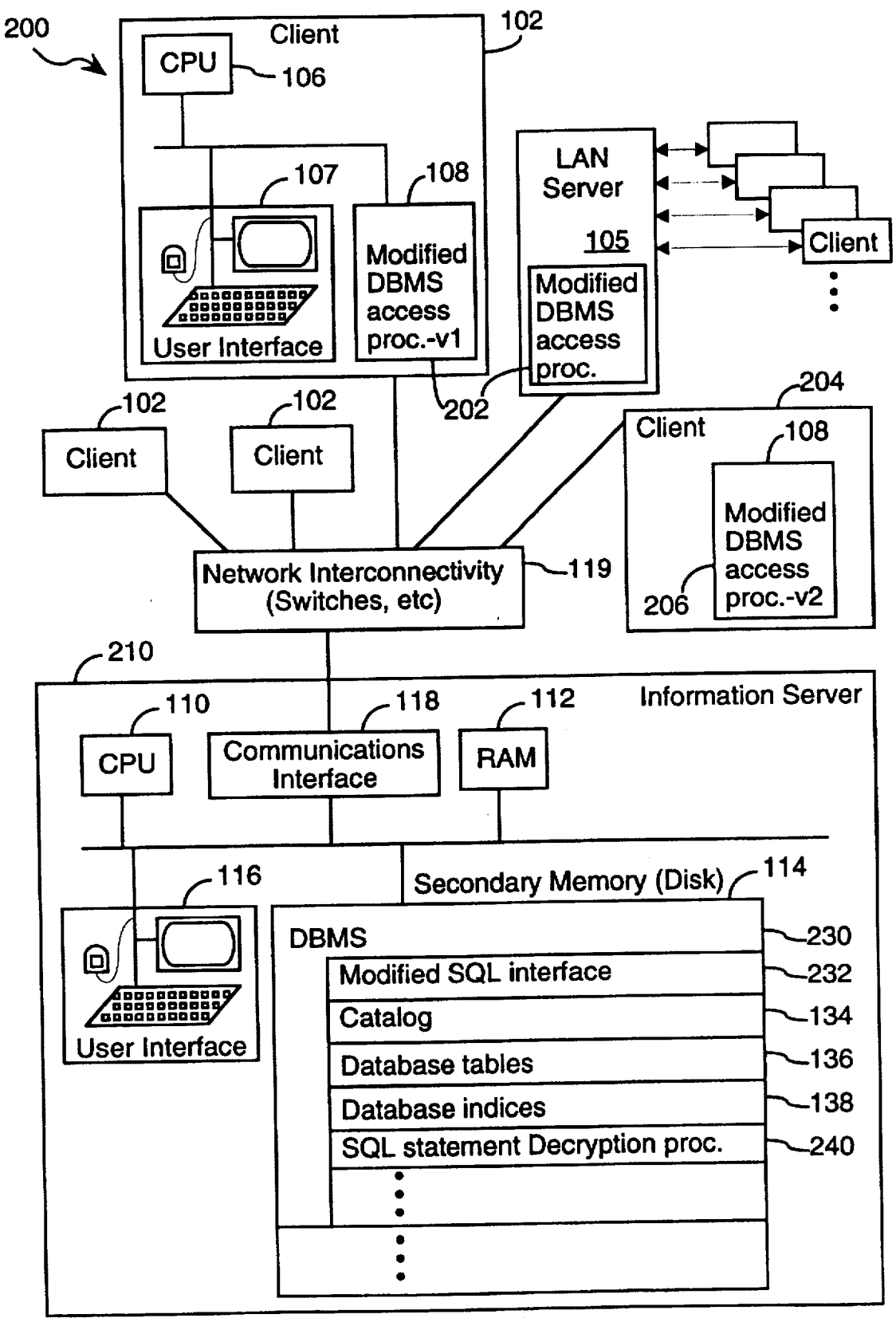
FIG. 2 is a block diagram of a distributed computer system incorporating the secure SQL statement handling procedures of the present invention.

Referring to FIG. 2, in a distributed computer system 200 incorporating the present invention, the untrusted client computers 102 have a first modified version of the DBMS access program 202, while trusted client computers 204 have a second modified version of the DBMS access program 206. The information server 210 in the preferred embodiment has a modified DBMS 230. In particular, the modified DBMS 230 has a modified SQL interface 232 which utilizes an SQL statement decryption procedure 240, as will be described in more detail next. The modified SQL interface 232, which is a software procedure executed by the information server, is sometimes called a "port" or "port procedure" because it acts as the port or procedure through which communications to and from client computers are routed. In some embodiments, port procedure 232, or portions of that procedure, may be a part of the information server that is external to the DBMS 230.

Figure 3:
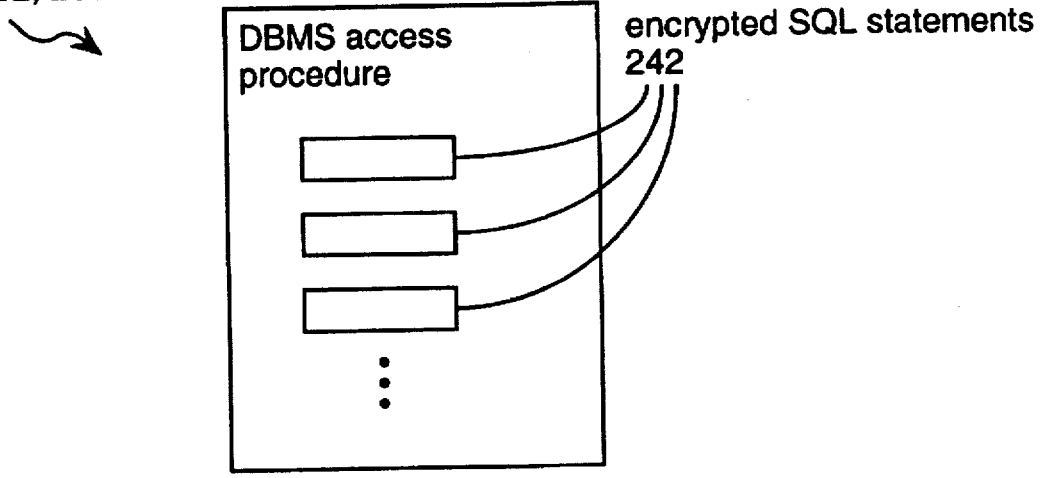
FIG. 3 is a block diagram of a DBMS access procedure in accordance with the present invention.

Referring to FIG. 3, the modified DBMS access procedure to be used by untrusted remote client computers contains a set of embedded constant strings 242, where each of the strings is generated using a secret encryption key:

encrypted SQL string=Encrypt (SQL statement with placeholders, encryption key)

where the "SQL statement with placeholders" includes placeholder symbols such as %1, %2, %3, . . . , where ever any arguments would be used in the SQL statement. For instance, an SQL statement having three arguments may have the form keyword1 (keyword2 %1 %2) keyword3 %3 where the symbols %1, %2 and %3 act as placeholders for the three arguments. As will be explained in more detail below, when using this SQL statement the client computer will specify argument values to replace the placeholders in the encrypted SQL string.

For the purposes of this document, the terms "encrypt" and "encode" are used synonymously to mean a procedure to encoding information in a secure manner that is extremely difficult for unauthorized personnel to replicate or reverse. Similarly, the terms "decrypt" and "decode" are used synonymously to mean a procedure for converting encoded information into "cleartext".

Any reasonably secure encryption procedure can be used to encrypt the SQL statements. For instance, the SQL statements could be encrypted using DES encryption, or using the private key of a public/private key pair using RSA encryption. When using DES encryption, the same key used to encrypt the SQL statements that are embedded in the modified DBMS access procedure will be used by the information server to decode (also called decrypt) the received SQL statements. When using RSA encryption, the private key of a public/private key pair is used to encrypt the SQL statements that are embedded in the modified DBMS access procedure, and the corresponding public key is used by the information server to decode the received SQL statements.

The embedded constant strings 242 (i.e., the embedded encrypted SQL statements) may be dispersed throughout the code of the procedure 202, 206 or may be stored in a table. The modified DBMS access procedure 202, 206 sends SQL statements to the information server as a combination of an encrypted string, representing the command portion of the SQL statement, and an argument string, which is used to replace the placeholder symbols in the encrypted string when it is processed by the information server:

encrypted SQL string, unencrypted argument string

In the modified DBMS access procedure 202 to be used by remote, untrusted client computers 102, the only SQL statements included in the procedure 202 in encrypted form are a predefined subset of SQL statements authorized for use by untrusted client computers. On the other hand, the modified DBMS access procedure 206 to be used by remote, trusted client computers 204, the SQL statements included in the procedure 206 in encrypted form will be a complete, or more complete set of the defined SQL statements, excluding "privileged" SQL statements reserved for use only by system operators and the like.

Figure 4:
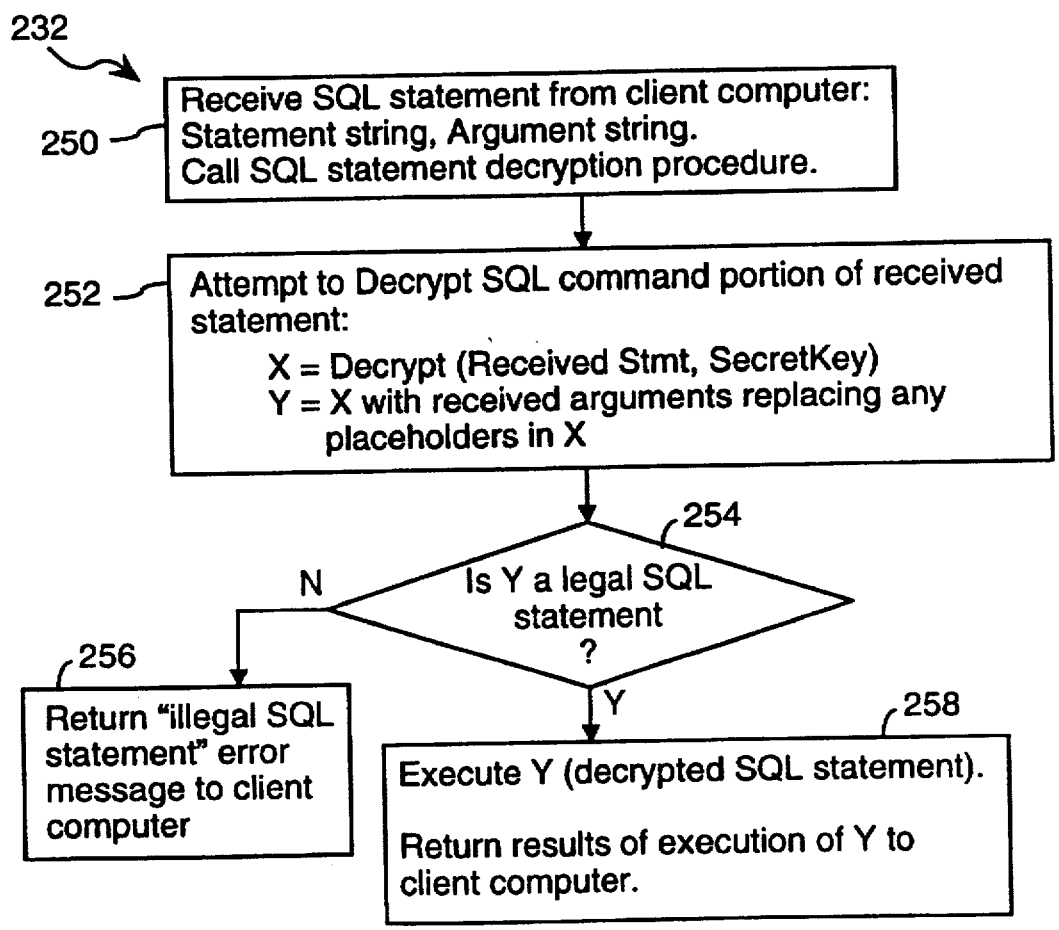
FIG. 4 is a flow chart of the SQL interface procedure used by an information server in accordance with a preferred embodiment of the present invention.

Referring to FIG. 4, the modified SQL interface 232 and the associated SQL statement decryption procedure 240 work as follows. When the modified SQL interface 232 procedure receives a SQL statement from a remote client (step 250), it will generally be of the form SQL statement string, argument string where the "argument string" can include one or more arguments.

The interface procedure 232 then calls the SQL statement decryption procedure 240 (step 252) to preprocess the received statement. The SQL statement decryption procedure attempts to decrypt the command portion of the received SQL statement:

X=Decrypt (command portion of received statement, secret key)

and then merges the received argument string, if any, with the result of the decoding (also known as decryption) step (step 252):

Y=X with received arguments, if any, replacing any placeholders in X

The interface procedure then checks to see if the resulting string Y is a legal SQL statement (step 254). If not, an error message is returned to the client computer (256). In more sophisticated versions of the interface procedure, the initial received SQL statement will be inspected, and if the received SQL statement was an unencrypted SQL statement, then the error message returned to the client may indicate that the client computer must use a specified DBMS access procedure.

If the resulting string Y is a legal SQL statement (step 254), the SQL statement represented by string Y is executed and the results of that execution are returned to the client computer (step 258).

Figure 5:
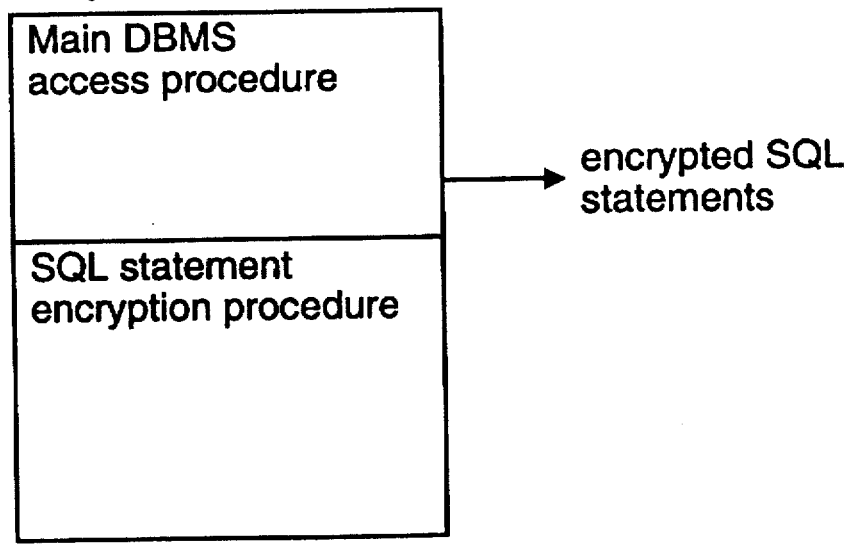
FIG. 5 is a block diagram of a second version of a DBMS access procedure in accordance with the present invention.

Referring to FIG. 5, in an alternate embodiment of the invention, the modified DBMS access procedure 206' used by trusted clients contains a main access procedure 270 that constructs SQL statements to be sent to the information server, and an SQL statement encryption procedure 272 that encrypts the command portion of the constructed SQL statement. The main access procedure 270 then transmits a message that includes the encrypted command portion of the SQL statement and an unencrypted argument string, if the constructed SQL statement included any arguments. The advantage of this version of the modified DBMS access procedure 206' for trusted clients is that this procedure can construct all possible SQL statements without having to store all such possible SQL statements as embedded encrypted strings as part of the procedure. The disadvantage of this version of the modified DBMS access procedure 206' for trusted clients is that it contains the encryption procedure, which could potentially be misused if a copy of the procedure fell into the possession of someone who wanted to breach the security of the information server.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A distributed computer system, comprising:

an information server, the information server including a database management system (DBMS) and a port for receiving and responding to SQL statements;

at least one client computer, coupled by a communication path to the information server; the at least one client computer including database access means for sending SQL statements database queries to the DBMS in the information server;

the database access means including a plurality of embedded constant strings, the plurality of embedded constant strings comprising pre-encrypted representations of a first subset of a predefined full set of SQL commands recognized as legal SQL commands by the DBMS in the information server; each of the SQL statements sent by the database access means to the DBMS in the information server including the pre-encrypted representation of one of the first subset of SQL commands;

wherein the first subset does not contain a predefined set of excluded SQL commands that are contained in the predefined full set; and the information server including means for processing the received SQL statements, including means for decoding the pre-encrypted representation of a SQL command included in each of the SQL statements sent by the database access means in the at least one client computer, and means for rejecting any received SQL statements that do not include a pre-encrypted representation of a SQL command that can be decoded by the decoding means into a corresponding one of the legal SQL commands using a predefined decoding methodology;

wherein the at least one client computer is unable to generate SQL statements containing representations of any SQL commands not included in the first subset that will be not be rejected by the information server.

2. The distributed computer system of claim 1, at least one other client computer, coupled by a communication path to the information server; the at least one other client computer including other database access means for sending SQL statements to the DBMS in the information server;

the other database access means including a second plurality of constant strings embedded in the other database access means, the second plurality of constant strings comprising pre-encrypted representations of a second subset of the predefined full set of SQL commands recognized as legal SQL commands by the DBMS in the information server; each of the SQL statements sent by the other database access means to the DBMS in the information server including the pre-encrypted representation of one of the second subset of SQL commands, wherein the second subset is different from the first subset of SQL commands.

3. The distributed computer system of claim 1, at least one trusted client computer, coupled by a communication path to the information server; the at least one trusted client computer including trusted database access means for sending SQL statements to the DBMS in the information server, each sent SQL statement including a pre-encrypted representation of a SQL command and an argument string, wherein the trusted database access means includes means for using in the SQL statements pre-encrypted representations of all SQL commands included in the predefined full set of SQL commands recognized as legal SQL commands by the DBMS in the information server.

4. In a distributed computer system having an information server and a plurality of client computers coupled by a communication path to the information server, the information server including a database management system (DBMS) with a port for receiving and responding to SQL statements; a method of limiting access to the DBMS by at least some of the client computers, comprising the steps of:

in at least one of the client computers, storing a plurality of constant strings, the plurality of constant strings comprising pre-encrypted representations of a first subset of a predefined full set of SQL commands recognized as legal SQL commands by the DBMS in the information server, wherein the first subset does not contain a predefined set of excluded SQL commands that are contained in the predefined full set; and generating SQL statements and sending the generated SQL statements to the DBMS in the information server, each of the generated SQL statements including the pre-encrypted representation of one of the first subset of SQL commands; and in the information server, processing the received SQL statements, including decoding the pre-encrypted representation of a SQL command included in each of the SQL statements sent by the at least one client computer, and rejecting any received SQL statements that do not include a pre-encrypted representation of a SQL command that can be decoded by the information server into a corresponding one of the legal SQL commands using a predefined decoding methodology;

wherein the at least one client computer is unable to generate SQL statements containing representations of any SQL commands not included in the first subset that will be not be rejected by the information server.

5. The method of claim 4, further including:

in at least one other client computer, storing a second plurality of constant strings, the second plurality of constant strings comprising pre-encrypted representations of a second subset of the predefined full set of SQL commands recognized as legal SQL commands by the DBMS in the information server; wherein the second subset is different from the first subset of SQL commands; and generating and sending SQL statements to the DBMS in the information server, each of the generated SQL statements including the pre-encrypted representation of one of the second subset of SQL commands.

6. The method of claim 4, further including:

in at least one trusted client computer, generating and sending SQL statements to the DBMS in the information server, each sent SQL statement including a pre-encrypted representation of a SQL command and an argument string, the generating step including using in the SQL statements encrypted representations of all SQL commands included in the predefined full set of SQL commands recognized as legal SQL commands by the DBMS in the information server.

* * * * *